United States Patent [19]

Satoh et al.

[11] 4,027,087

[45] May 31, 1977

[54] METHOD FOR PRODUCING ETHYLENE POLYMERS

[75] Inventors: Akihiro Satoh, Yokosukashi; Shiro Konotsune, Yokohamashi; Atsuyuki Kachi, Yokohamashi; Hiroshi Shimizu, Yokohamashi, all of Japan

[73] Assignee: Chisso Corporation, Osaka, Japan

[22] Filed: Oct. 30, 1972

[21] Appl. No.: 301,908

[52] U.S. Cl. .................... 526/114; 252/429 C; 526/115; 526/116; 526/119; 526/121; 526/124; 526/351; 526/352

[51] Int. Cl.$^2$ .............. C08F 4/02; C08F 10/02

[58] Field of Search ......... 260/88.2, 94.9 DA, 93.5; 526/114, 115, 116, 119, 121, 124

[56] References Cited

UNITED STATES PATENTS

| | | | |
|---|---|---|---|
| 2,981,725 | 4/1961 | Luft et al. | 260/94.9 DA |
| 3,647,772 | 3/1972 | Kashiwa | 260/94.9 DA |
| 3,718,636 | 2/1973 | Stevens et al. | 260/94.9 DA |

FOREIGN PATENTS OR APPLICATIONS

| | | |
|---|---|---|
| 1,904,815 | 9/1969 | Germany |
| 2,035,943 | 2/1971 | Germany |
| 1,189,038 | 4/1970 | United Kingdom |

*Primary Examiner*—Edward J. Smith
*Attorney, Agent, or Firm*—Fred Philpitt

[57] ABSTRACT

Ethylene can be polymerized or copolymerized by the use of a catalyst prepared by mixing a trivalent metal halide with a metal carbonate or/and a metal hydrogen carbonate, reacting the resulting mixture with a transition metal compound in the presence of an aromatic compound, and activating the resulting solid product with an organoaluminum compound.

By substituting said metal carbonate or/and metal hydrogen carbonate for metal salt hydrates, sulfide hydrates, hydroxides or hydroxide hydrates, or metal oxides in our prior art, drawbacks such as dehydrochlorination in the preparation of catalyst or difficulty in removal of catalyst residue from polymer can be overcome while various advantages in our prior art are still maintained.

13 Claims, No Drawings

METHOD FOR PRODUCING ETHYLENE POLYMERS

This invention relates to a method for producing ethylene polymers. More particularly, it relates to a method for polymerizing ethylene along or copolymerizing ethylene with other α-olefins or styrene in the presence of a catalyst prepared by using a metal carbonate or/and a metal hydrogen carbonate, a trivalent metal halide, an aromatic compound, a transition metal compound and an organoaluminum compound.

Previously, the present inventors proposed a method for polymerizing α-olefins in the presence of a catalyst which comprises subjecting to a burning reaction, a trivalent metal halide and at least one compound selected from the group consisting of halide hydrates, sulfide hydrates, sulfate hydrates, hydroxides and hydroxide hydrates of metals belonging to I – VIII groups of the Periodic Table of elements, so as to form active groups on the surface of the resultant product of the burning reaction, reacting the resulting burning reaction product with a transition metal compound, and combining the resulting reaction product with an organoaluminum compound (U.S. Ser. No. 23,484 filed on Mar. 27, 1970 as a continuation-in-part application of U.S. Ser. No. 794,421, and now abandoned).

According to this process, it is possible to obtain superior effectivenesses such as extremely high available efficiency of transition metal compound; remarkable effectiveness of reduction in molecular weight due to hydrogen; and no formation of polymer film on the wall of polymerizing reactor. On the other hand, the method in which the above mentioned metal compound hydrates, hydroxides or hydroxide hydrates are used as one component of the catalyst, accompanies a dehydrochlorination caused by the burning reaction, and further, often, a dehydrochlorination also at the time of the reaction between the burning reaction product and the transition metal compound, whereby corrosion of apparatuses occurs and further, a problem occurs in the operation of catalyst preparation.

After strenuous studies for overcoming the above-mentioned drawbacks, we further proposed a more advantageous process in which metal oxides are substituted for the above-mentioned compound hydrates, hydroxides or hydroxide hydrates of metals of I – VIII groups, whereby similar effectivenesses to those of the above-mentioned method can be obtained; burning reaction is unnecessary at the time of the reaction thereof with a trivalent metal halide; and hence disadvantageous dehydrochlorination does not occur to make easier the operation of catalyst preparation (U.S. Ser. No. 54,865 filed on July 14, 1970 and now abandoned).

However, such an important method still has drawbacks that catalyst residue is liable to remain in polymer and removal of the residue from the polymer is cumbersome.

The first object of this invention is to provide a method for polymerizing ethylene or copolymerizing ethylene with other α-olefins or ethylene with styrene in the presence of a catalyst containing as a component thereof, a solid product in the preparation of which no dehydrochlorination occurs thereby to make easier the operation of catalyst preparation and also to make easier the removal of catalyst residue from polymer.

The process of the present invention is suitable for polymerization or copolymerization of α-olefins other than ethylene, but particularly suitable for preparation of homopolymer or copolymers of ethylene according to the above-mentioned process.

Another object is to provide a method for polymerization in which the yield of the resulting polymer or copolymers of ethylene per g/hr of transition metal of catalyst used is extremely high; there is no formation of polymer film on the wall of polymerization reactor during polymerization; and further, control of molecular weight by hydrogen can be well carried out.

A further object is to provide a polymerization method which enables to maintain the dispersibility of catalyst on a suitable level, to elevate the polymerization activity of catalyst and further to control the density of polymer, whereby polymers having superior properties can be obtained.

Other objects will be apparent from the explanation hereinafter described.

The present invention resorts to a method for producing polyethylene or copolymers of ethylene with other α-olefins or styrene which comprises polymerizing ethylene or copolymerizing ethylene with other α-olefins or styrene in the presence of a catalyst obtained by mixing a carbonate or/and a hydrogen carbonate of metals belonging to I to IV, VII and VIII groups of the Periodic Table of the elements, with a trivalent metal halide; reacting the resulting mixture with a compound of metals belonging to IVa or Va group of the Periodic Table of the elements in the presence of an aromatic compound; and activating the resulting solid product with an organoaluminum compound.

As the carbonates or hydrogen carbonates to be used in the method of this invention, there can be illustrated $LiCO_3$, $Na_2CO_3$, $NaHCO_3$, $K_2CO_3$, $KHCO_3$, $Cs_2CO_3$, $Ag_2CO_3$, $MgCO_3$, $CaCO_3$, $BaCO_3$, $ZnCO_3$, $CdCO_3$, $Tl_2CO_3$, $PdCO_3$, $MnCO_3$, $FeCO_3$, $NiCO_3$, etc.

As the trivalent metal halides to be used in this invention, there can be illustrated anhydrides of $AlCl_3$, $AlBr_3$, $FeCl_3$, etc.

These carbonates or/and hydrogen carbonates and trivalent metal halides are mixed by means of a suitable apparatus such as ball mill or the like. There is no particular limitation to the mixing ratio, but it will be sufficient to use a trivalent metal halide in an amount of 0.01 to 2 moles relative to a mole of the carbonates or/and hydrogen carbonates.

The mixture of a carbonate or/and a hydrogen carbonate and a trivalent metal halide can be subjected to the reaction with a transition metal compound in the presence of an aromatic compound described hereinafter, but it is also preferable to heat the above-mentioned mixture in the atmosphere of an inert gas in advance, followed by subjecting to the reaction with a transition metal compound in the presence of an aromatic compound. There is no particular limitation to heating temperature, but it is preferable to be in the range from room temperature to 500° C. As for heating period of time, 10 minutes to several ten hours are suitable.

As the aromatic compounds to be present at the time of the reaction of a mixture of a carbonate or/and a hydrogen carbonate and a trivalent metal halide, or the mixture heated, with a transitional metal compound, there can be illustrated benzene, naphthalene, pyridine, etc., and further, alkyl-substitutes such as toluene, xylene, mesitylene, durene, ethylbenzene, isopropylbenzene or the like, derivatives of polycyclic aromatic compounds such as 2-ethylnaphthalene, 1-phenylnaphthalene or the like, aniline derivatives having no active hydrogen such as dimethyl aniline or the like, amine derivatives having no active hydrogen such as N-methyl-diphenyl-amine, triphenylamine or the like, nitro or nitroso derivatives such as nitrobenzene, nitrosobenzene, p-nitrosotoluene or the like, halides such as monochlorobenzene, orthochlorotoluene or the like, alkoxide derivatives such as anisole, ether derivatives such as diphenyl ether, phenols and compounds containing unsaturated bond such as styrene, divinylbenzene or the like. These aromatic compounds (which will be hereinafter abbreviated merely as aromatic compounds) are preferably used alone or in a mixture thereof, but these can be also used in a mixture thereof with a saturated aliphatic hydrocarbon such as n-heptane, octane or the like. As the transition metal compounds to be used, there can be illustrated halides, hydroxyhalides, alkoxy halides and alkoxides of transition metals, e.g. Ti and V, belonging to IVa and Va groups of the Periodic Table, such as titanium tetrachloride, titanium monoethoxytrichloride, titanium tetrabutoxide, titanium tetraethoxide, titanium tetramethoxide, vanadium tetrachloride, vanadium oxytrichloride, etc. When a transition metal compound belonging to IVa or Va group of the Periodic Table (which will be hereinafter abbreviated merely to transition metal compound) is reacted with a mixture of a carbonate or/and a hydrogen carbonate and a trivalent metal halide or the mixture heated, in the presence of an aromatic compound, the fixation of the transition metal compound cannot be well effected to a too low temperature, and also a high reaction temperature such as those over 300° C necessitates conditions under pressure and hence is unsuitable. Thus, the reaction is carried out usually at a temperature in the range from room temperature to 300° C, preferably from 50° to 200° C.

The reaction between the mixture of a carbonate or/and a hydrogen carbonate with a trivalent metal halide or the mixture heated, and a transition metal compound in the presence of an aromatic compound, can be carried out by any of known methods. For example, a mixture of a carbonate or/and a hydrogen carbonate and a trivalent metal halide or the mixture heated is maintained in a suspended state in the presence of a solvent of an aromatic compound or a solvent mixture of an aromatic compound and an aliphatic hydrocarbon, and a transition metal compound is added to this suspension and reacted therewith. Alternatively, a transition metal compound is mixed with the above-mentioned solvent at first and thereafter mixed and reacted with the above-mentioned mixture of a carbonate or/and a hydrogen carbonate with a trivalent metal halide. The resulting solid product produced by these methods (which will be hereinafter abbreviated merely to solid product) is filtered, then washed carefully with a dehydrated hydrocarbon solvent till the solvent contains no trace of transition metal compound.

Alternatively, without filtering the abovementioned resulting solid product as above, the abovementioned reactants are completely reacted, and the resulting slurry of the solid product containing no free transition metal, is used, as it is, in the subsequent operation of catalyst preparation. Further, alternatively, a mixture or the mixture heated, of a carbonate or/and a hydrogen carbonate and a trivalent metal halide, after treated in advance with said solvent or its vapor, is reacted with a transition metal compound.

The mechanism of the reaction of a mixture or the mixture heated of a carbonate or/and a hydrogen carbonate and a trivalent metal halide with a transition metal compound in the presence of an aromatic compound, has not yet been confirmed, but after the reaction, the transition metal compound is chemically bonded to said mixture, and cannot be removed from the resulting solid product by physical means such as washing.

Next, this solid product must be activated in contact with an organoaluminum compound. As activating agents therefor, trialkylaluminums such as trimethylaluminum, triethylaluminum, triisobutylaluminum, alkylaluminum halides such as diethylaluminum monochloride, ethylaluminum sesquichloride, monoethylaluminum dichloride are particularly suitable.

A carbonate or/and a hydrogen carbonate, a trivalent metal halide, an aromatic compound and a transition metal compound are essential components for the solid product in the present invention, and if any one of them is deficient, a highly active polymerization catalyst cannot be obtained in combination with an organoaluminum compound. For example, highly active polymerization catalysts cannot be obtained by the reaction of a mixture or the mixture heated of a carbonate or/and a hydrogen carbonate and a trivalent metal halide with a transition metal compound if an aromatic compound is absent. And even if a carbonate or/and a hydrogen carbonate is reacted with a transition metal compound in the presence of an aromatic without using a trivalent metal halide, there will be obtained only a catalyst having a much lower activity, as compared with that of the solid product used in this invention.

The catalyst used in this invention exerts a preferable catalytic action upon the homopolymerization of ethylene or copolymerization of ethylene with another α-olefin or styrene.

The α-olefin includes those generally known as α-olefin such as propylene, butene-1, hexene-1, octene-1,decene-1 and other straight chain monoolefins, and 3-methyl-1-butene, 4-methyl-1-pentene and other branched mono-α-olefins.

Polymerization reaction is usually carried out in an inert hydrocarbon solvent, and preferable results are obtained generally when polymerization reaction temperature is in the range from −50° to about 150° C, preferably from 20° to 100° C, and pressure is in the range from the atmospheric pressure to 100 kg/cm², preferably from the atmospheric pressure to 40 kg/cm².

In the practice of polymerization reaction, titanium alkoxide can be added to the polymerization system, as an additive. Particularly when titanium alkoxide is added to the reaction system together with hydrogen, remarkably excellent effectiveness can be exhibited. Namely, the density can be readily controlled, and the physical properties of the resultant polymer, particularly stress cracking-resistant property can be remarkably improved.

Further, the dispersibility of catalyst can be improved; the agglomeration of polymer particles can be prevented; and uniform and fine particles of polymer can be obtained. Furthermore, due to a great increase in catalyst activity, the amount of polymer produced per unit weight of catalyst is remarkably increased, and hence, the avialable efficiency of the transition metal becomes extremely higher. At the same time, it is possible to carry out the removal of catalyst residue from polymer more readily. Still further the control of molecular weight of polymers can be very easily and effectively carried out.

As titanium alkoxides, titanium tetraalkoxides are suitable, and more particularly, titanium tetra-n-butoxide, titanium tetraethoxide and titanium tetramethoxide are illustrated as preferable examples.

The amount of titanium alkoxide to be used is preferably in the range from 0.1 to 0.5 mmoles per gram of the solid product. When the amount of titanium alkoxide used is lower than the range, effectiveness decreases, while, when it exceeds the range, the soluble portion in the polymerization product increases which is undesirable.

The amount of hydrogen to be used must be in the range of 10 – 80% (by volume) based upon the total amount of ethylene and hydrogen.

The advantage of the preparation of polymerization catalyst according to the present invention is that since a metal carbonate or/and a metal hydrogen carbonate is used as one component of the catalyst, no dehydrochlorination is accompanied in the reaction with a trivalent metal halide, and also in the reaction with a transition metal compound in the presence of an aromatic compound, and hence there can be gained various merits in the preparation of catalyst, such that no corrosion of apparatus occurs and a solid catalyst which is superior in reproducibility and stabilized, can be prepared through a shorter course of process.

Another effectiveness of this point is an extremely high available efficiency of the transition metal compound, as is clear from the fact that the yield of polymer per gram per hour of transition metal used amounts to as much as polymer $10^4$ g/Ti g/hr.

A further great advantage of this invention is that, according to this invention, the removal of catalyst residue from polymer in the post-treatment subsequent to polymerization can be readily carried out.

A still further advantage is that, according to the method of this invention, phenomena as seen in case where a catalyst consisting of a liquid transition metal compound such as titanium tetrachloride and an organoaluminum compound is used, such that a polymer film is formed on the wall of polymerization vessel to make the control of polymerization difficult and degrade the product, are not observed.

The present invention is further illustrated by the following non-limitative Examples. Melt index (MI) was measured according to ASTM 1238-65T, throughout the Examples.

EXAMPLE 1 a. Preparation Of Catalyst

Ten grams magnesium carbonate and 4 g of aluminum trichloride (anhydrous) were mixed, ground and heated in the atmosphere of nitrogen gas at 100° C for 5 hours and then cooled. Ten grams of the mixture was introduced into a 200 ml volume eggplant-shape flask and 15 ml of xylene and 1 ml of titanium tetrachloride were added thereto. The resulting mixture was reached in a stream of nitrogen gas with stirring at 90° C for one hour. After completion of the reaction, the resulting product was filtered in a dry box filled with nitrogen gas and washed four times each with 40 ml of n-hexane. After removing unreacted titanium tetrachloride fully, drying was carried out under a reduced pressure for one hour to give a solid product (I). This solid product contained 12.1 mg of titanium atom per gram thereof.

b. Polymerization Of Ethylene

After a 1.5 l stainless steel reactor equipped with a stirrer was flushed with nitrogen gas, it was charged with 700 ml of n-hexane, 120 mg of the solid product obtained in (a) and 350 mg of triethylaluminum. The reactor was closed, and 1.5 kg/cm$^2$ gage of hydrogen gas and 3.0 kg/cm$^2$ gage of ethylene were fed thereto. Polymerization reaction was carried out under a hydrogen pressure of 1.5 kg/cm$^2$ (gage) and an ethylene pressure of 3.0 kg/cm$^2$ (gage), at a temperature of 80° C for one hour. The resulting polymer was of fine powders and no adhesion of polymer to the wall of the reactor was observed. After completion of the reaction, the catalyst was deactivated by a conventional procedure, followed by washing, filtering and drying to give 60.8 g of white powders. The formation rate of polymer per gram of the solid product (I) was 506 g/g/hr. The yield of polymer per g of Ti atom contained in the solid product (I) was 41,800 polymer g/Ti g/hr. Thus, both the values were extremely high.

MI was 0.58. Residue of catalyst was 80 ppm. This value was extemely low.

EXAMPLE 2

Example 1 was repeated except that 15 ml of benzene was used in place of 15 ml of xylene to give a solid product (II). This solid product (II) contained 11.1 mg of titanium atom per g thereof.

Using this solid product (II), polymerization of ethylene was carried out similarly to the process of Example 1. The results are shown in Table 1.

EXAMPLE 3

Example 1 was repeated except that 15 ml of orthochlorotoluene was used in place of 15 ml of xylene to give a solid product (III). The solid product (III) contains 9.8 mg of titanium atom per g thereof.

Using this solid product (III), polymerization of ethylene was carried out similarly to the process of Example 1. The result are shown in Table 1.

EXAMPLE 4

Example 1 was repeated except that 15 ml of anisole was used in place of 15 ml of xylene to give a solid product (IV) which contained 17.8 mg of titanium atom per g thereof.

Using this solid product (IV), polymerization of ethylene was carried out similarly to the process of Example 1. The results are shown in Table 1.

EXAMPLE 5

Example 1 was repeated except that a solvent mixture of 10 ml of n-heptane and 5 ml of dimethylaniline was used in place of 15 ml of xylene to give a solid product (V), which contained 12.3 mg of titanium atom per g thereof.

Using this solid product (V), polymerization of ethylene was carried out similarly to Example 1. The results are shown in Table 1.

EXAMPLE 6

Example 1 was repeated except that a solvent mixture of 1 ml of styrene and 15 ml of n-heptane was used in place of 15 ml of xylene to give a solid product (VI) which contained 9.8 mg of titanium atom per g thereof.

Using this solid product (VI), polymerization of ethylene was carried out in accordance with the process of Example 1. The results are shown in Table 1.

Comparative Example 1

Example 1 was repeated except that 15 ml of n-heptane was used in place of 15 ml of xylene to give a solid product (VII), which contained 10.8 mg of titanium atom per g thereof.

Using this solid product (VII), polymerization of ethylene was carried out similarly to the manner of Example 1. The results are shown in Table 1.

Comparative Example 2

Example 1 was repeated except that without using any solvent, 7 ml of titanium tetrachloride was used in place of 15 ml of xylene and 1 ml of titanium tetrachloride to give a solid product (VIII) which contained 7.8 mg of titanium atom per g thereof.

Using this solid product (VIII), polymerization of ethylene was carried out similarly to the manner of Example 1. The result are shown in Table 1.

Table 1

(effect of solvent used in the preparation of solid product)

| Example No. | Solvent | Polymer Formation rate* | MI | Bulk density |
|---|---|---|---|---|
| 1 | xylene | 506 | 0.58 | 0.250 |
| 2 | benzene | 328 | 0.41 | 0.238 |
| 3 | o-chlorotoluene | 354 | 0.48 | 0.218 |
| 4 | anisole | 298 | 0.40 | 0.225 |
| 5 | n-heptane / dimethyl-aniline solvent mixture | 285 | 0.38 | 0.235 |
| 6 | n-heptane / styrene solvent mixture | 328 | 0.40 | 0.238 |
| Comparative Example 1 | n-heptane | 46 | measurement impossible | 0.254 |
| Comparative Example 2 | — | 26 | measurement impossible | 0.238 |

*polymer g/solid product g/hr

COMPARATIVE EXAMPLE 3

Magensium carbonate dried at 140°C for 48 hours was ground without adding aluminum trichloride (anhydrous). Ten grams of the ground product was placed in a 200 ml eggplant-shape flask, and Example 1 was repeated using 15 ml of xylene and 1 ml of titanium tetrachloride to give a solid product (IX), which contained 9.8 Ti mg/solid product g.

Using this solid product (IX), polymerization of ethylene was carried out similarly to the manner of Example 1. Formation rate of polymer per g of the solid product was 30 polymer g/solid product g/hr.

In comparision with Example 1 which was carried out in the presence of aluminum trichloride, this catalyst had extremely low activity. MI measurement was impossible.

Example 7

10 g of manganese carbonate and 8 g of aluminum trichloride were mixed in a stainless ball mill purged with nitrogen gas and grinding was carried out while heating at 110°C for 5 hours. Subsequent procedure was carried out similarly to Example 1 to give a solid product (X). The content of titanium atom in this solid product (X) was 11.5 Ti mg per g of solid product.

Using this solid product (X), ethylene was polymerized similarly to Example 1. The results are shown in Table 2.

EXAMPLE 8

Example 1 was repeated except that 10 g of potassium carbonate was substituted for 10 g of magnesium carbonate to gice a solid product (XI). This solid product (XI) contained 7.6 mg of titanium atom per g of the product.

Using this solid product (XI), ethylene was polymerized similarly to the process of Example 1. The results are shown in Table 2.

EXAMPLE 9

Example 1 was repeated except that 10 g of sodium hydrogen carbonate was substituted for 10 g of magnesium carbonate to give a solid product (XII). The content of titanium atom in this solid product was 6.5 Ti mg/g.

Using the solid product (XII), ethylene was polymerized similarly to the process of Example 1. The results are shown in Table 2.

EXAMPLE 10

Example 1 was repeated except that 10 g of nickel carbonate ($NiCO_3$) was substituted for 10 g of magnesium carbonate to give a solid product (XIII) which contained 6.5 mg of titanium atom per g of the product.

Using this solid product (XIII), ethylene was polymerized similarly to the process of Example 1. The results are shown in Table 2.

EXAMPLE 11

Example 1 was repeated except that 10 g of lead carbonate was substituted for 10 g of magnesium carbonate to give a solid product (XIV) which contained 6.9 mg of titanium atom per g of the product.

Using this solid product (XIV), ethylene was polymerized similarly to the process of Example 1. The results are shown in Table 2.

Table 2

(effect of variation in kind of carbonate or hydrogen carbonate in the preparation of solid product)

| | Kind of carbonate or hydrogen carbonate | Polymer Formation rate* | MI | Bulk density |
|---|---|---|---|---|
| Example | | | | |
| 7 | manganese carbonate | 459 | 0.75 | 0.218 |
| 8 | potassium carbonate | 215 | 0.18 | 0.230 |
| 9 | sodium hydrogen carbonate | 189 | 0.15 | 0.254 |
| 10 | nickel carbonate | 314 | 0.35 | 0.222 |
| 11 | lead carbonate | 192 | 0.20 | 0.218 |

*polymer g/solid product g/hr

EXAMPLE 12

10 g of magnesium carbonate and 4 g of ferric trichloride (anhydrous) were put into a ball mill, mixed and ground for 5 hours while heating at 100°C. Thereafter, the mixture was cooled and 10 g portion of it was introduced in a 200 ml eggplant-shape flask and 15 ml of monoethylbenzene and 1 ml of titanium tetrachloride were added thereto and then reaction was carried out under a stream of nitrogen gas for one hour at 140°C with stirring.

Subsequent procedure was carried out similarly to the process of Example 1 to give a solid product (XV) which contained 6.9 mg of tiitanium atom per g of the product.

Using this solid product (XV), ethylene was polymerized similarly to the process of Example 1. 85.4 g of polymer was obtained and the formation rate of the polymer was 498 g/g/hr. Thus an extremely high polymerization activity was obtained as compared with that of Comparative Example 3 in which no ferric trichloride was used. MI =0.75.

EXAMPLE 13

10 g of calcium carbonate and 6 g of aluminum trichloride were mixed and ground and then 15 ml of monochlorobenzene and 4 ml of vanadium tetrachloride were added thereto. Reaction was carried out under a stream of nitrogen gas at 150°C for one hour with stirring. Subsequent procedure was carried out similarly to the process of Example 1 to give a solid product (XVI) which contained 12.8 mg of vanadium atom per g of the product.

Using this solid product (XVI), ethylene was polymerized similarly to the process of Example 1. The formation rate of the resultant polymer was 165 g/g/hr. MI =1.0.

EXAMPLE 14

Using 150 mg of the solid product (I) obtained by the process of Example 1, and 420 mg of diethylaluminum monochloride, ethylene was polymerized according to the process of Example 1. Thus, 25.1 g of polymer was obtained, and the formation rate of polymer was 167 g/g/hr. MI =0.12.

EXAMPLE 15

Propylene was polymerized according to the process of Example 1. Using 250 mg of the solid product (I), 420 mg of triethylaluminum and 700 ml of n-hexane, propylene was polymerized for one hour at 70°C under 7 kg/cm² of gauge pressure.

After completion of the polymerization reaction, conventional treatment was carried out to give 32.0 g of a white polymer. The formation rate of the polymer was 128 g/g, hr. Resultant polypropylene had the following properties:

$[\eta]$ (in tetralin at 135°C): 1.98
n-heptane-insoluble: 45%

EXAMPLE 16

Butene-1 was polymerized according to the process of Example 1.

Using 230 mg of the solid product (I) obtained by the process of Example 1, 400 mg of triethylaluminum and 500 ml of n-hexane, polymerization was carried out for 3 hours while heating at 80°C, after 68 g of butene-1 was fed at room temperature.

After completion of the polymerization reaction, conventional treatment was carried out to give 59 g of a white polymer. Conversio of butene-1 was 86.8%.
$[\eta]$(in tetralin at 135°C): 1.25

EXAMPLE 17

Copolymerization of ethylene-propylene was carried out according to the process of Example 1.

Using 114 mg of the solid product (I) obtained by the process of Example 1, 420 mg of triethylaluminum and 700 ml of n-hexane, and introducing 0.5 g of propylene weighed in advance, polymerization reaction was carried out for one hour at 70°C, under 0.5 kg/cm² (gauge) of hydrogen pressure and 3.0 kg/cm² (gauge) of ethylene pressure.

After completion of the polymerization reaction, conventional treatment was carried out to give 31.5 g of a white polymer. This polymer was identified to be a copolymer by infrared spectrum and had the following properties:

Density (at 25°C): 0.9425
$[\eta]$(in tetralin at 130°C): 1.89

EXAMPLE 18

Copolymerization reaction of ethylene-butene-1 was carried out according to the process of Example 1.

Using 210 mg of the solid product (I) obtained by the process of Example 1, 400 mg of triethylaluminum and 700 ml of n-hexane, and after feeding 0.7 g of butene-1 at room temperature, followed by elevation of temperature to 70°C, polymerization reaction was carried out for one hour, under 0.3 kg/cm² (gauge) of hydrogen pressure and 3.0 kg/cm² (gauge) of ethylene pressure.

After completion of polymerization reaction, conventional treatment was carried out to give 75 g of a white polymer. This polymer was identified to be a copolymer by infrared spectrum and had the following properties:

Density (25°C): 0.9338
$[\eta]$(in tetralin at 130°C): 1.98

EXAMPLE 19

Copolymerization reaction of ethylene-styrene was carried out according to the process of Example 1.

Using 205 mg of the solid product (I) obtained by the process of Example 1, 400 mg of triethylaluminum and 700 mg of n-hexane, and after feeding 10 ml of styrene, polymerization reaction was carried out for one hour at 70°C, under 0.5 kg/cm² (gauge) of hydrogen pressure and 3.0 kg/cm² (gauge) of ethylene pressure.

After completion of the polymerization reaction, conventional treatment was carried out to give 48 g of a white polymer. This polymer was identified to be a copolymer by infrared spectrum. This copolymer had the following properties:

Density (25°C): 0.9450
$[\eta]$(in tetralin at 130°C): 2.18

Example 20

In the polymerization according to the process of Example 1, titanium tetra-n-butoxide was added as an additive.

Using 185 mg of the solid product (I) obtained by the process of Example 1, 0.42 mmol of titanium tetra n-butoxide, 4.2 mmole of triethylaluminum and 700 ml of n-hexane, polymerization reaction was carried out for one hour at 80°C under 1.0 kg/cm² (gauge) of hydrogen pressure and 3 kg/cm$^2$ (gauge) of ethylene pressure.

After completion of the polymerization reaction, conventional treatment was carried out to give 107 g of a white polymer.

Agglomeration of polymer was not observed. The formation rate of polymer was 580 g/g/hr. MI =0.38 BD (bulk density) =0.320 Density =0.9380

Stress cracking-resistant property of this polymer was measured according to the method of ASTM D-1693--60T. The polymer had such an excellent physical property that more than 1200 hours were required till 50% breakage. For comparison's sake, a polymer similarly obtained except that titanium tertra-n-butoxide was not added, was subjected to the measurement of stress cracking-resistant property. It required 21 hours till 50% breakage. BD was 0.189.

EXAMPLE 21

In the ethylene polymerization according to the process of Example 1, titanium tetra-n-butoxide was added as an additive.

Using 115 mg of the solid product (X) obtained by the process of Example 7, 0.38 mmole of titanium tetra- n-butoxide, 4.2 mmoles of triethylaluminum and 700 ml of n-hexane, polymerization reaction was carried out for one hour at 70°C under 0.5 kg/cm$^2$ (gauge) of hydrogen pressure and 2.5 kg/cm$^2$ (gauge) of ethylene pressure.

After completion of the polymerization reaction, conventional treatment was carried out to give 65 g of a white polymer. The yield of polymer was 564 g/g/hr. MI =0.29 BD =0.345 Density =0.9420

The stress cracking-resistant property of this polymer was measured according to the method of ASTM D-1693- -60T. The polymer had such an excellent property that more than 1500 hours were required till 50% breakage. For comparison's sake, a polymer similarly obtained except that titanium tetra-n-butoxide was not added, was subjected to the measurement of stress cracking-resistant property, and it required 18 hours till 50% breakage. BD was 0.210.

What is claimed is:

1. A method for producing ethylene polymers which comprises polymerizing ethylene alone, ethylene with an α-olefin or ethylene with styrene at −50° to about 150°C at atmospheric pressure to 100 kg/cm$^2$ in the presence of a catalyst obtained by (i) mixing a trivalent metal halide selected from the group consisting of AlCl$_3$, AlBr$_3$ and FeCl$_3$ with a carbonate of metals belonging to I, II & IV, VII and VIII groups of the periodic table and/or a hydrogen carbonate of metals belonging to I group of the periodic table, (ii) reacting the resulting mixture with a compound of transition metals belonging to IV$_a$ and V$_a$ groups of the periodic table in the presence of an aromatic compound having no active hydrogen, and (iii) combining the resulting solid product with an organoaluminum compound.

2. A method according to claim 1, wherein said polymerizing is carried out in the copresence of 10 –80% by volume of hydrogen based on the total volume of ethylene alone, ethylene with an α-olefin or ethylene with styrene and hydrogen, and a titanium alkoxide.

3. A method according to claim 2, wherein said titanium alkoxide is a titanium tetraalkoxide.

4. A method according to claim 2, wherein said titanium alkoxide is selected from the group consisting of titanium n-butoxide, titanium tetraethoxide and titanium tetramethoxide.

5. A method according to claim 1, wherein said carbonate is selected from the group consisting of Li$_2$CO$_3$, Na$_2$CO$_3$, K$_2$CO$_3$, Cs$_2$CO$_3$, Ag$_2$CO$_3$, CaCO$_3$, MgCO$_3$, BaCO$_3$, ZnCO$_3$, CdCO$_3$, Tl$_2$CO$_3$, PbCO$_3$, MnCO$_3$, FeCO$_3$ and NiCO$_3$.

6. A method according to claim 1, wherein said hydrogen carbonate is selected from NaHCO$_3$ and KHCO$_3$.

7. A method according to claim 1, wherein said aromatic compound having no active hydrogen is selected from the group consisting of benzene, naphthalene, pyridine, toluene, xylene, mesitylene, durene, ethylbenzene, isopropylbenzene, 2-ethylnaphthalene, 1-phenylnaphthalene, dimethylaniline, N-methyldiphenylamine, triphenylamine, nitrobenzene, nitrosobenzene, p-nitrotoluene, monochlorobenzene, o-chlorobenzene, anisole, phenylether, styrene and divinylbenzene.

8. A method according to claim 1, wherein said compound of transition metals is selected from the group consisting of titanium tetrachloride, titanium monoethoxy- trichloride, titanium tetrabutoxide, titanium tetraethoxide, titanium tetramethoxide, vanadium tetrachloride and vanadium oxytrichloride.

9. A method according to claim 1, wherein said organoaluminum compound is selected from the group consisting of trimethylaluminum, triethylaluminum, triisobutylaluminum, diethylaluminumchloride, ethylaluminum sesquichloride, and monoethylaluminum dichloride.

10. A method according to claim 2, wherein said reacting (ii) is carried out at a temperature of 50 –200°C.

11. The method of claim 1 wherein the trivalent metal halide is employed in an amount of 0.01 to 2 moles per mole of the carbonate and/or hydrogen carbonate.

12. The method of claim 1 wherein the reaction is carried out at a temperature in the range from 20°to 100°C and at a pressure from atmospheric pressure to 40 kg/cm$^2$.

13. The method of claim 1 wherein the polymerization reaction is carried out in the presence of an inert hydrocarbon solvent.

* * * * *